Feb. 8, 1966

J. C. SILLIMAN ETAL 3,233,638

MACHINE FOR MAKING WIRE REINFORCEMENT CAGES

Filed Sept. 18, 1962

INVENTORS
JOHN C. SILLIMAN
GEORGE E. HUCK
BY

Mason & Graham

ATTORNEYS

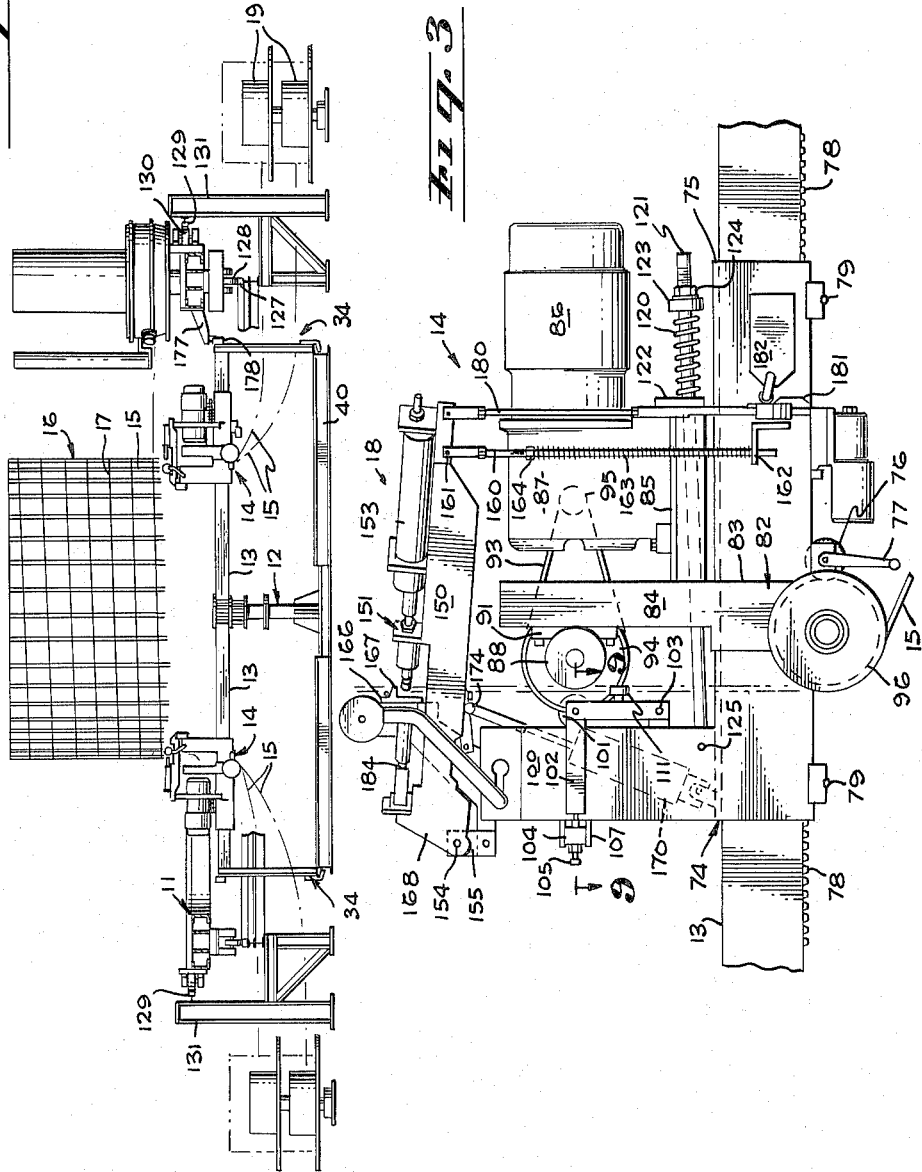

INVENTORS
JOHN C. SILLIMAN
GEORGE E. HUCK

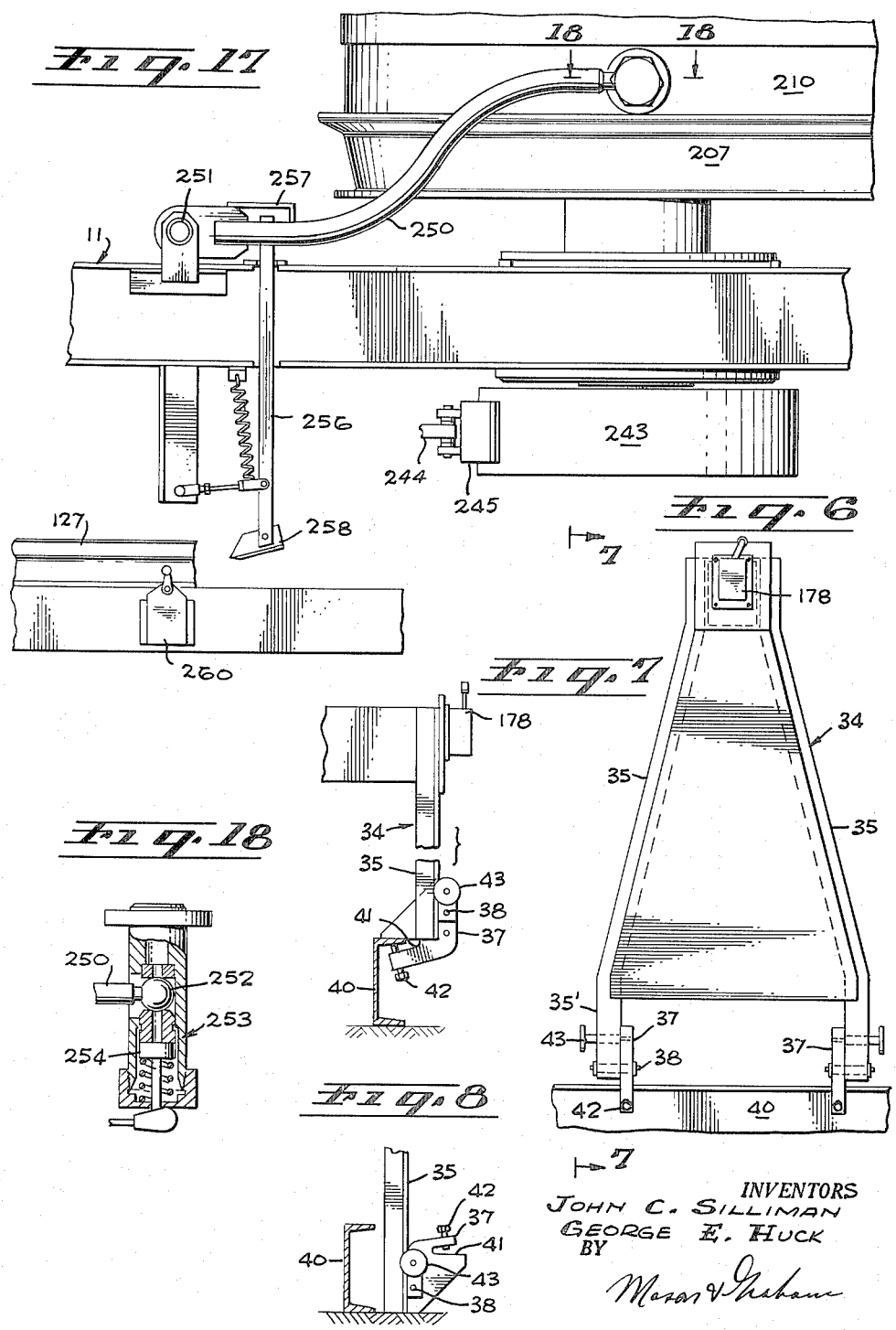

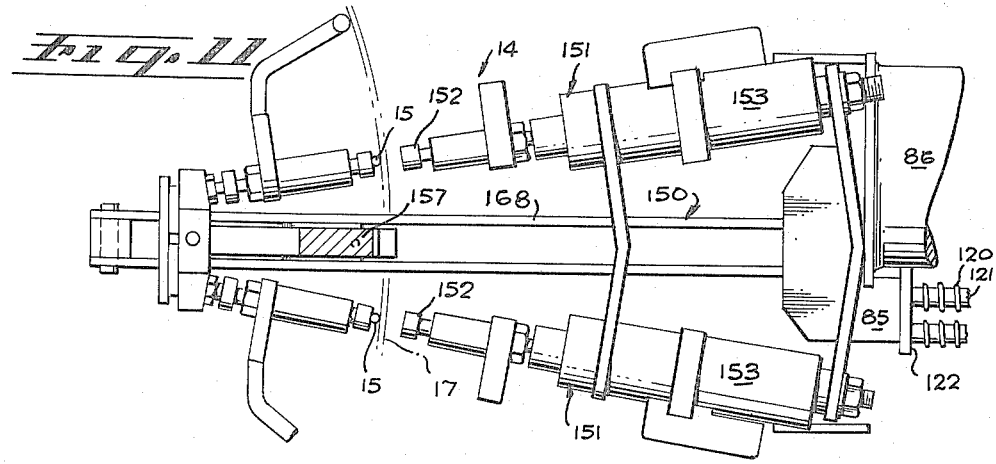
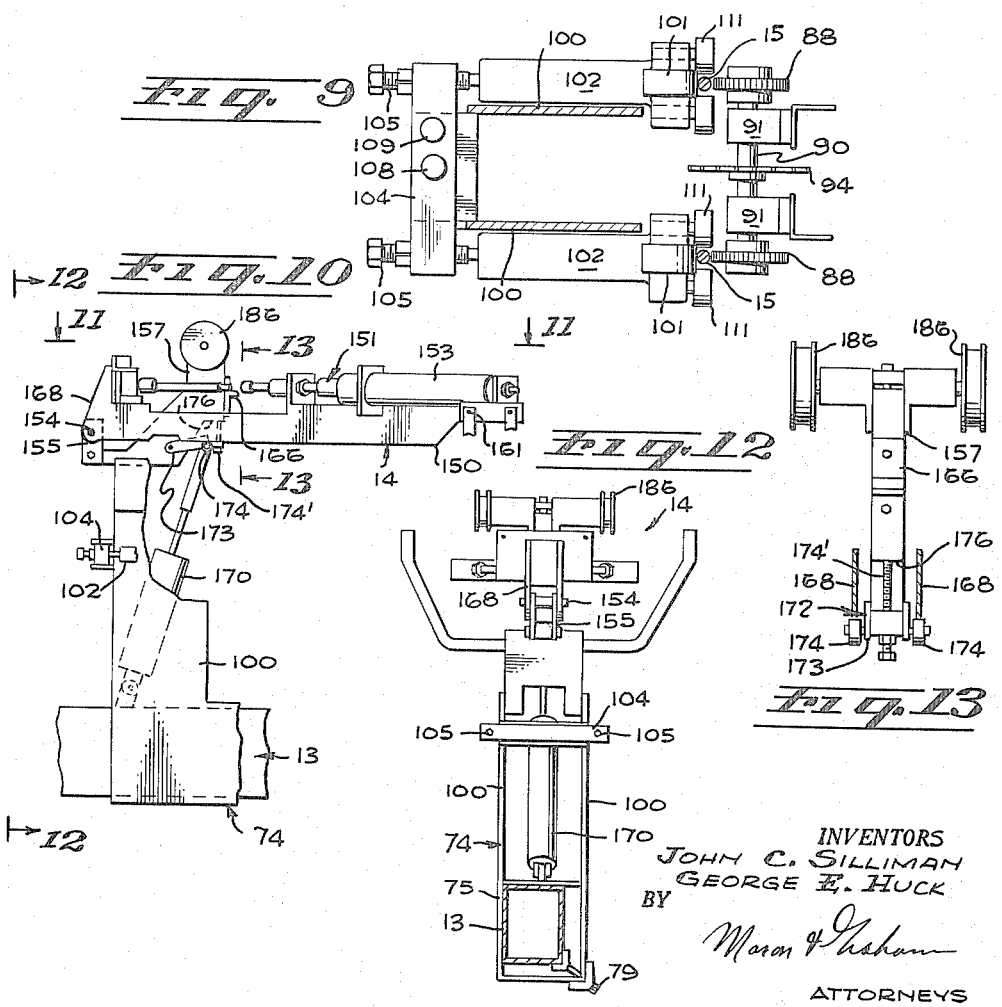

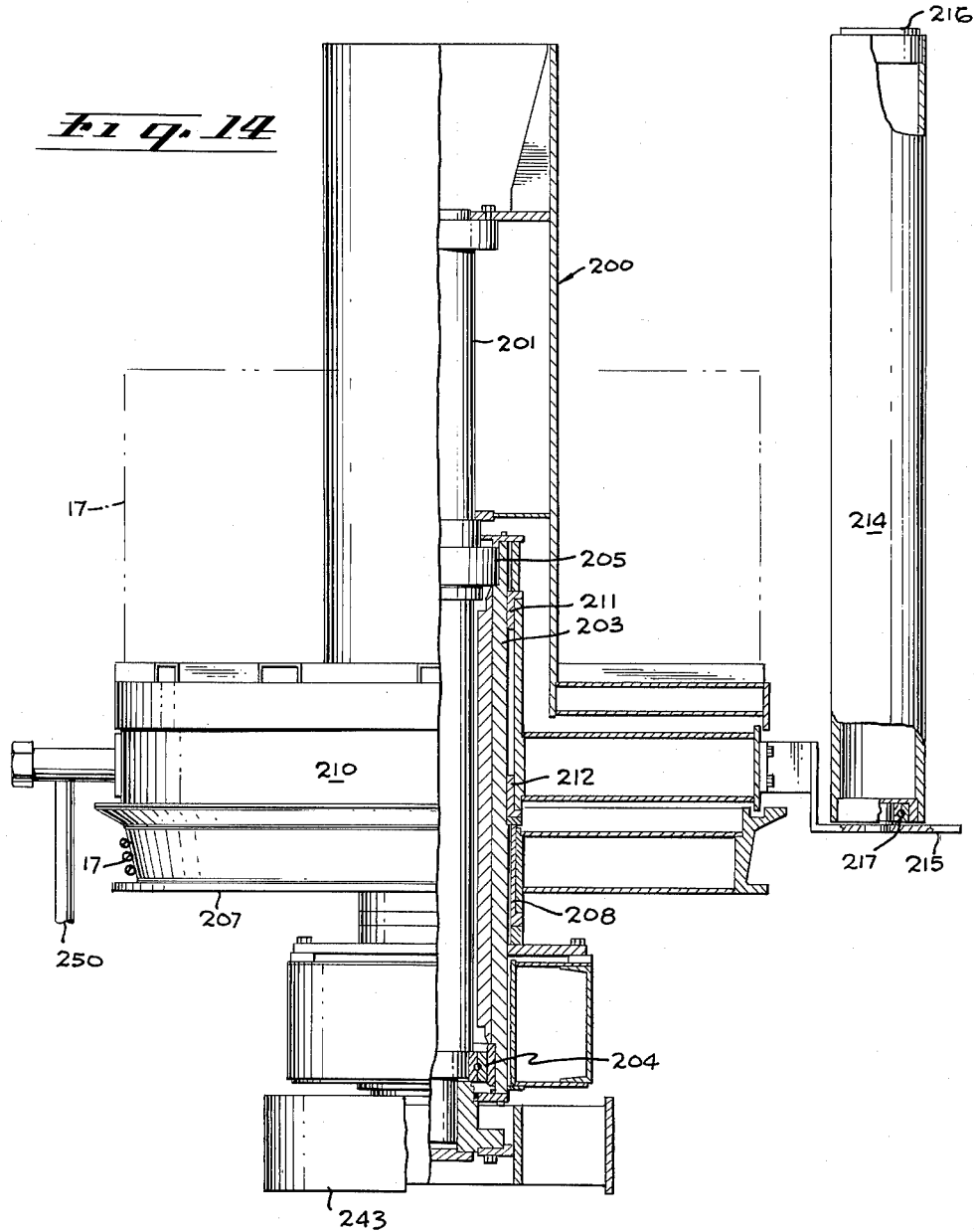

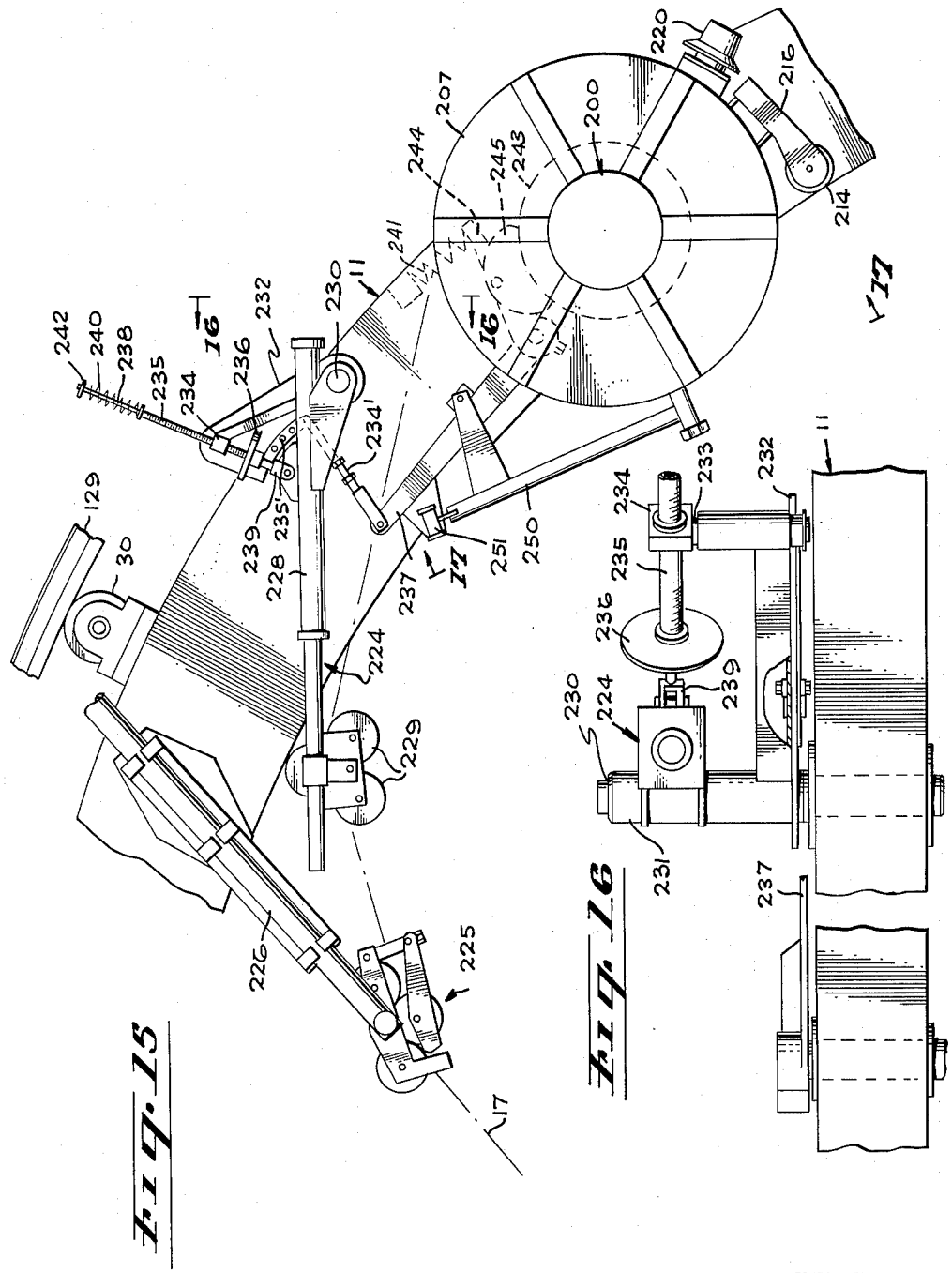

United States Patent Office 3,233,638
Patented Feb. 8, 1966

3,233,638
MACHINE FOR MAKING WIRE REINFORCE-
MENT CAGES
John Calvin Silliman, La Habra, and George Edward
Huck, Fullerton, Calif., assignors to American Pipe
and Construction Co., South Gate, Calif., a corporation
of California
Filed Sept. 18, 1962, Ser. No. 224,437
20 Claims. (Cl. 140—112)

This invention has to do with apparatus for the fabrication of reticulated wire structures, particularly wire reinforcement cages as used in the manufacture of concrete pipe.

Reinforcement cages made of relatively large-diameter wire include several straight longitudinal wires and one or more wires wrapped helically therearound with the wires welded together at the intersections or points of crossover, the entire structure being generally tubular and usually cylindrical.

An object of the invention is to provide a novel machine for the continuous fabrication of wire cages about a vertical axis in a manner such that the cage rises without rotating as it is formed and can be cut off at any time to give the desired length of cage.

Another object is to provide such a machine which is readily adjustable for fabricating cages of different diameters, different cross-sectional shapes, variable pitch circumferential windings and different numbers of longitudinal wires.

A further object is to provide novel means for welding the intersections of the longitudinal wires of the cage with the circumferential wire that is wrapped helically therearound. In this connection it is an object to provide novel welding apparatus which is normally positioned out of the way of the circumferential wire being wound and which, when actuated, moves to welding position, grips the wires to be welded and then travels with the wires until the electric welding cycle has been completed, after which it returns to its original position.

Another object is to provide novel means for feeding the longitudinal wires vertically. In this connection it is a particular object to provide a plurality of novel individual wire feed units which are mounted for adjustable positioning radially of a center point and which carry both means for feeding the wires longitudinally and means for effecting the welding operations.

A further object is to provide novel apparatus for winding the circumferential wire around the vertically rising wires to dispose it helically thereon including novel safety means for stopping the operation of the machine in the event of failure of the circumferential wire to pay out properly.

Another object is to provide novel means for coordinating and synchronizing the various means for feeding the longitudinal cage wires and the circumferential wire.

A further object is to provide a novel center post construction and radial beam arrangement for mounting the units which feed the longitudinal wires of the cage vertically and which perform the welding operations.

Another object is to provide a center post having novel bus bar means for the distribution of electrical current to the welding electrodes.

A more general object is to provide a machine for the fabrication of wire cages rapidly and economically as compared to other machines with which we are familiar.

These and other objects will be apparent from the drawings and the following description. Referring to the drawings:

FIG. 2 is a sectional elevation view on line 2—2 of FIG. 1;

FIG. 3 is a side elevational view of one of the wire feed and welding units, on a larger scale;

FIG. 6 is an end elevational view of one of the beams supporting frames;

FIG. 7 is a fragmentary sectional elevational view on line 7—7 of FIG. 6;

FIG. 8 is a fragmentary view similar to FIG. 7 but showing the parts in lowered, out-of-service position;

FIG. 9 is an enlarged fragmentary sectional view on line 9—9 of FIG. 3;

FIG. 10 is a fragmentary elevational view similar to FIG. 3, the welding assembly being shown in initial weld position;

FIG. 11 is a sectional plan view on the line 11—11 of FIG. 10, but on a larger scale;

FIG. 12 is a sectional elevational view on line 12—12 of FIG. 10;

FIG. 13 is a sectional elevational view on line 13—13 of FIG. 10, but on a larger scale;

FIG. 14 is a sectional elevational view of the circumferential wire spool assembly;

FIG. 15 is a plan view of the spool of FIG. 14 and associated wire lead and brake linkage mechanism;

FIG. 16 is a fragmentary sectional view on line 16—16 of FIG. 15;

FIG. 17 is a fragmentary elevational view on line 17—17 of FIG. 15; and

FIG. 18 is an enlarged sectional view on line 18—18 of FIG. 17.

Figure 1:
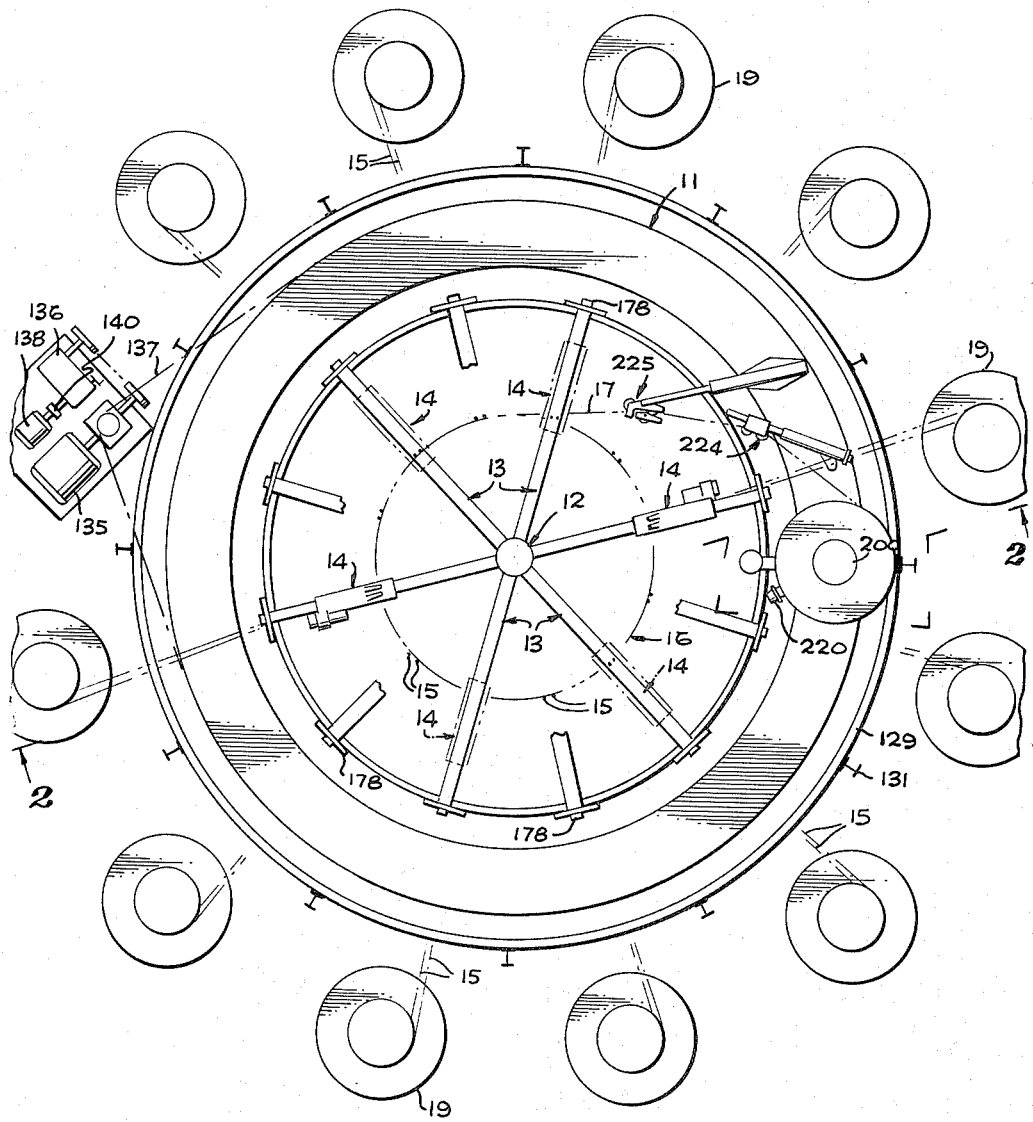
FIG. 1 is a fragmentary plan view of apparatus embodying the invention, the view being partially diagrammatic.

In general, the machine includes an annular turntable 11 which rotates around a central post 12 from which radiate beams 13 carrying units 14 for vertically feeding wires 15 which are to become the longitudinal wires of a cage 16. The turntable carries a supply of the circumferential wire 17 which is wrapped around the rising longitudinal wires as they rise to produce a helical wrap. Units 14 also carry welding means, designated 18, for joining the intersection of the wires. As will later appear, units 14 are adjustable along the beams 13 and thus can be set to make a cage of any preselected diameter or cross-sectional shape within the dimensional limits of the apparatus. Units 14 are supplied with wire from reels 19 located around the periphery of the apparatus.

Figure 4:
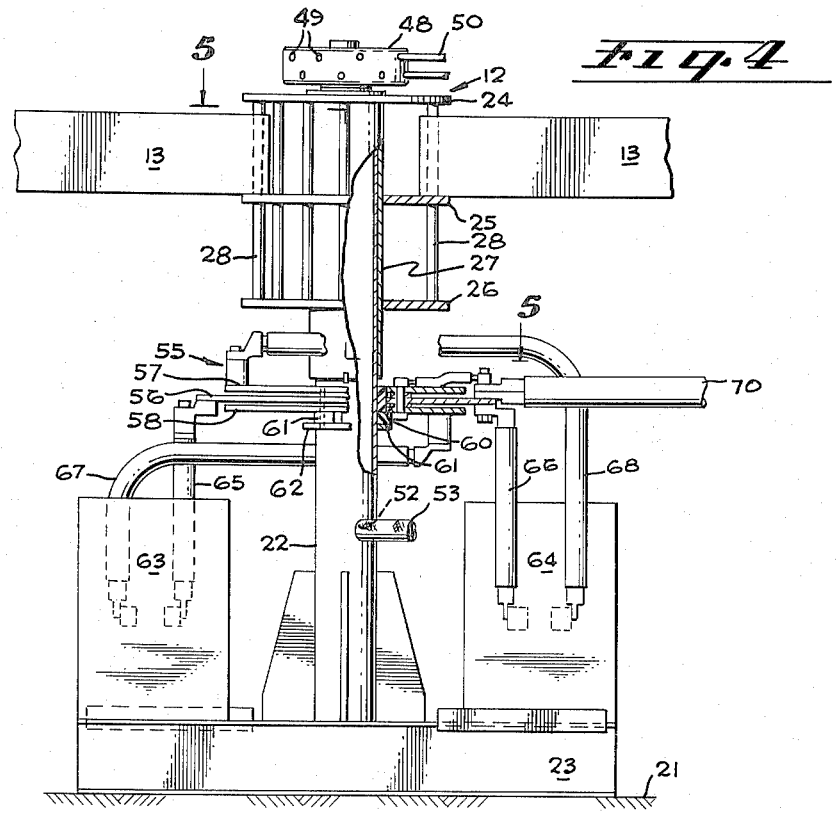
FIG. 4 is an elevational view, partly in section, showing the center post.
Figure 5:
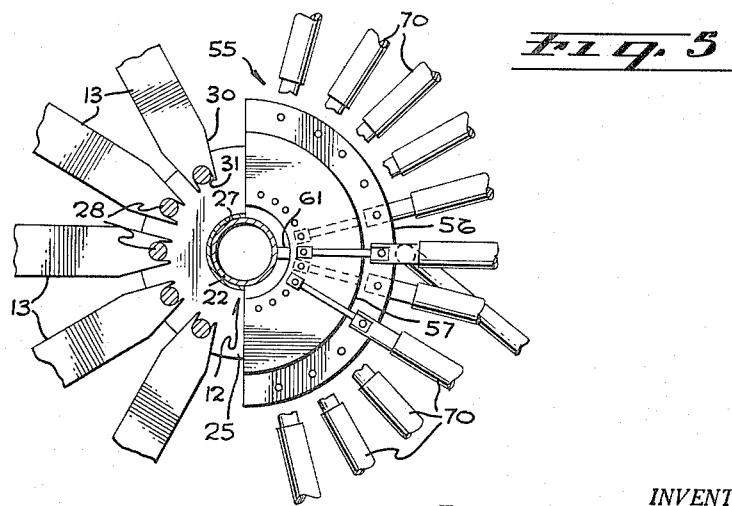
FIG. 5 is a sectional plan view in two planes on line 5—5 of FIG. 4.

The post 12 is mounted centrally of the structure on any suitable foundation 21 and includes a tubular column 22 on a base 23. At its upper end (FIGS. 4, 5) this post carries a double deck support which comprises three annular plates 24, 25 and 26 fixed to a sleeve 27 and a plurality of circumferentially spaced vertical pins 28. The inner ends of beams 13 are selectively mounted to rest on either the intermediate plate 25 or the lower plate 26. Each beam has a tapered inner end 30 with a recess 31 therein to receive one of the pins 28 which serves to locate the beam and hold it against lateral movement. The beams may be tubular structural steel elements of rectangular cross section, although this is not essential.

The outer ends of beams 13 are supported by frames 34 (FIGS. 6, 7, 8) which include two diverging legs 35 and a plate 36 welded thereto. Each leg is fitted at its lower end portion 35' with a bracket 37 pivotally mounted at 38. Normally the brackets are positioned as shown in FIGS. 6 and 7 and resting upon a base ring 40, the upper flange of which is received in a recess 41 in the bracket and clamped by a screw 42. However, the brackets can be pivoted upwardly to an inoperative position by retracting a locking pin 43 which permits the frame to rest upon the ground or foundation 21 and thus position the beam in a lower, out-of-service position.

With the above arrangement, when the beams are in the upper position (inner ends on plate 25 and outer end frame on base rail 40) they are high enough to support units 14 in operative position relative to the other parts of the apparatus, but when in lower position they are not. In making cages of small diameter it is unnecessary to use all the units 14 and this arrangement thus permits units 14 to be taken out of service without removing them from the apparatus.

The center post 12 is provided with a header 48 at its upper end having outlets 49 for the distribution of cooling water through flexible tubes 50 to various water-cooled electric cables and to the welding guns. The post also has a water inlet 52 which can be connected by a hose 53 to a suitable source.

Post 12 also serves to support a bus bar assembly 55 which comprises three annular plates, namely, a center plate 56, an upper plate 57 and a lower plate 58. The plates are vertically spaced by insulation spacers 60 and supported as a unit on insulator blocks 61 on a mounting flange 62. Two transformers, 63 and 64, are shown connected to the common center plate 56 at diametrically opposite points by leads 65 and 66, respectively. Leads 67 and 68 connect the transformers to the upper and lower plates, respectively, at opposite sides of the post. With this arrangement the current paths to the various cables 70 leading to the welding guns are the same length, resulting in uniform welds. Each cable 70 has one conductor connected to the common center plate and another to one of the other plates.

As previously indicated, the wire feed units 14 are mounted on the beams 13, respectively. Each unit includes a frame 74 (FIG. 3) which has a tubular base section 75 receiving the beam and provided with a pinion 76 having a handle 77, the pinion meshing with a rack 78 formed on a portion of the lower surface of the beam. Setscrews 79 are provided for tightening the unit in place at an adjusted position along the beam. Each unit 14 is capable of feeding either one or two wires 15 vertically and, by arranging the units at the proper distance from the center post, a cage of the desired diameter and cross-sectional shape can be fabricated.

A motor support frame 82 is provided on the tubular section 75 of the main frame and this includes a tubular lower section 83 which receives and is slidable on the tubular section 75 of the main frame, a pair of uprights 84 and a platform 85. The latter supports a motor 86 having reduction gearing 87. The motor drives a pair of feed rollers 88 which are fixed to a shaft 90 (FIG. 9) journaled in pillow blocks 91 on frame elements 84. The shaft is turned by a chain 93 passing around sprockets 94 and 95 fixed to the shaft 90 and the reduction gear unit 87, respectively. The surfaces of the drive wheels are preferably formed with a toothed peripheral surface to grip the wires 15. Frame 82 also carries a pair of guide rollers 95 directly below the feed rollers.

Frame 74 includes a pair of upright parallel plates 100 which carry backup rollers 101 opposed to the feed rollers 88. Each backup roller is mounted on an L-shaped lever 102 (FIGS. 3, 9) which is pivotally mounted at its lower end at 103. The levers are adjusted and held by an equalizer bar 104 containing setscrews 105 which bear against the inner ends of the levers. The bar is pivotally mounted between shelves 107 of frame 74 on a center pin 108, thus equalizing the force applied to the two backup rollers when two wires 15 are being fed. When only one wire is being fed, the bar is locked against pivotal movement by insertion of a pin through hole 109 and a registering hole in the shelves 107. Each lever 102 also carries a pair of lateral guide rollers 111, the axis of which is normal to the axis of the rollers 101.

To cause the feed rollers 88 and the backup rollers 101 to grip the wires 15 tightly enough to feed the wires and raise the cage 16 as it is fabricated, frame 82, which carries the motor and the feed rollers, is yieldably urged toward the backup rollers by a set of coil springs 120 on rods 121 which bear against the outer edge 122 of platform 85 and a bar 123 held by nuts 124 on the rods. The latter are pivotally mounted at their inner ends at 125 on frame 74.

As previously indicated, we provide a turntable 11 which carries the supply of circumferential wire 17 which is wrapped around the wires 15 as they move upwardly. The turntable is supported on a circular base rail 127, being provided with a plurality of circumferentially spaced wheels 128 which ride thereon. A guide rail 129 surrounds the table, the latter having a plurality of wheels 130 which ride against the rail. Frame elements 131 support the rails.

The turntable is driven by a variable speed electric motor 135 (FIG. 1) through a reduction gear unit 136 and a chain 137 driven thereby and extending around the table. Unit 136 also drives a master selsyn electric motor 138 through a variable ratio drive unit 139 and a clutch 140. Motor 138 is electrically connected to the individual motors 86 (slave selsyn motors) of the wire feed units 14 in a conventional manner for such systems. With this arrangement, feeding of the wires 15 vertically is synchronized both with respect to each other and to movement of the turntable which carries the wire 17 around the rising wires 15. Feeding of the vertical wires can be interrupted while continuing the feeding of the circumferential wire, as for winding a flat turn, by disengaging clutch 140 through which the master selsyn motor 138 is driven.

With the understanding that the circumferential wire 17 is wound around the rising wires 15 by rotation of the turntable and the action of apparatus carried thereby which will be described later, the means 18 for welding the intersections or crossovers of the circumferential wire and the rising vertically disposed wires will now be described. Referring particularly to FIGS. 3 and 10–13, the welding gun assembly includes a pivotally mounted frame 150 which carries a pair of welding guns 151 disposed in converging relation. Each gun may be of conventional design and includes an electrode 152 and a fluid ram 153 for moving it forward and retracting it. At its inner end the frame is pivotally mounted at 154 upon a pair of links 155, the links being pivotally mounted in turn at 156 upon a headpiece 157 carried by the two upright plates 100 of frame 74. The outer end of frame 150 is supported upon a pair of rods 160 which are pivotally mounted at their upper ends at 161 and slidably received in guides 162 provided on the main frame 74. Coil springs 163 are positioned between the guides and adjustable nuts 164.

In FIG. 3 the welding assembly is shown in normal position below the elevation of the circumferential wire 17 which is wound about the upright wires and anvils 166, lying just above the tongue 167 of each anvil. The anvil is carried upon member 157 projecting between the parallel plates 168 of frame 150. The latter is raised to initial weld position by a piston-cylinder unit 170 which is pivotally connected to frame 74 and a lever assembly 172. The latter includes two lever arms 173 which are pivotally mounted at their inner ends on upright frame plates 100. These arms carry a pair of rollers 174 located directly under the lower edges, respectively, of the frame members 168. Thus when unit 170 is expanded by suitable pressure fluid the welding guns are elevated to the position in which they are shown in FIG. 9. The stroke of unit 170 is limited by an abutment screw 174', carried by the lever assembly between the rollers, which abuts the lower edge 176 of member 157 as the parts move upwardly.

The cylinder 170 is initially actuated by a finger 177 on the turntable which operates a switch 178 on the end of each beam 13. The switch closes a circuit through a suitable solenoid valve which directs air to cylinder 170 to raise the welding gun frame to the position of FIG. 10. When the welding gun frame has risen to such position the electric welding cycle is initiated and while this can be accomplished in various ways we show a depending actuating rod 180 which carries a cam 181 to operate a switch 182. The latter may be connected in the control circuit for solenoid-operated valves which serve to cause the welding guns to move inward against the circumferential wire and initiate the electrical welding cycle through suitable means. Backup electrodes 184 are positioned in registration with the movable electrodes behind the wires 15. The electrodes then grip the wires and the electrode or welding assembly rises therewith to make the welds. When the weld is completed the clamping pressure is released and the lifting cylinder and welding gun frame as a whole return to normal, lowered position due to the action of gravity.

Each of the frames 74 also carries a pair of guide wheels 186 above the welding units at the upper end of frame 157.

Referring now FIGS. 14–16, a supply of the circumferential wire 17 which is to be wound around the rising longitudinal wires is provided on a spool 200 which is fixed to a rotatable shaft 201. The latter is journaled in a stationary column 203 mounted in the turntable 11, bearings 204 and 205 being provided between the parts. Also mounted on the column is a reserve sheave 207 which may contain two or three turns of the wire after it leaves the spool. This sheave rotates on a bearing 208 between its inner wall and the column 203.

Between the reserve sheave and the spool we provide a normally stationary stripping roller hub 210 which is mounted on column 203 with bearings 211 and 212 between the two. Hub 210 carries a stripping roller 214 between a bracket 215 and an upper plate 216, the roller being mounted upon a bearing 217. The wire is fed from the spool around this stripping roller and then about a snubbing roller 220, also mounted on hub 210. The wire then makes two or three turns around the reserve sheave 207 from which it passes to a torque sensing arm assembly 224 and then through the fair-lead assembly 225 on the end of a boom 226. The boom is fixed to the turntable but may be adjusted thereon both longitudinally and angularly for different diameter cages.

The torque sensing means includes an arm 228 with sheaves 229 at the end over which the wire passes. The arm is pivotally mounted on a shaft 230 which is fixed to the turntable. The arm includes a collar 231 fitting about the shaft and a laterally projecting bracket 232 which is provided with a pivotal post 233. The latter is fitted with a nut 234 to receive a threaded tube 235 carrying an integral handwheel 236. Received in the tube is a rod 238 which is pivotally connected to the arm at 239 and which is provided with a coil spring 240 at its other end beyond the tube, the spring being held by an abutment nut and washer assembly 242.

A brake assembly is adjustably attached to the bracket 232 and includes an adjustable link 234' which is selectively mounted in holes 235' in the bracket. The link is pivotally connected to the outer end of a brake lever 237 which operates a brake rod 244 carrying a brake shoe 245 against the action of a spring 241. The shoe operates against a drum 243 provided at the lower end of the spool shaft 201.

With this arrangement the winding pull of the wire through the sheaves of the torque sensing arm applies or releases the brake as required to prevent overrunning or backlash of the wire. The sensing means is adjustable to give any desired tension on all sizes of wire.

The machine is also fitted with a safety means which operates in the event the coil of wire on the spool should snarl or snub so that the wire would not feed off. This means includes a bar 250 of S-shape which is pivotally mounted at its lower end at 251 on the turntable. This bar normally prevents rotation of the hub 210 which carries the stripping roller. The upper end of the bar is provided with a ball 252 fitted in a detent assembly 253 carried on the hub. The latter includes a spring-pressed plunger 254 which normally holds the bar in place. In the event of undue force on the bar such as would occur were the wire to fail to feed off the spool, the bar pulls out of assembly 253 thereby freeing the stripping roller to permit it to rotate with the spool and allow the two or three turns of wire on the reserve sheave to unwind.

Dropping of bar 250 lowers a rod 256 which is secured thereby by a bracket 257. The rod has a foot 258 which engages the next of a series of switches 260 spaced around the framework and connected to stop the entire machine.

We claim:

1. In a machine for fabricating reinforcement wire cages, a plurality of horizontal beams extending radially from a common center with their outer ends in circumferentially spaced relation, means supporting said beams in a normal position, means releasably securing said beams in said normal position, means for supporting said beams in a lowered position, at least certain of said beams being lowerable to said lowered position, a stationary wire feed unit mounted on each beam, each unit having means for feeding a wire vertically, a circumferential wire feed means mounted for circular movement around the vertically fed wires, and welding units carried by said feed units for welding the intersections of the vertically fed wires and the wire wrapped therearound, each said wire feed units being in an operative position when the beam on which it is mounted is in said normal position and being in an inoperative position when such beam is in said lowered position.

2. In a machine for fabricating reinforcement wire cages, a plurality of stationary wire feed units disposed at points spaced circumferentially about a common center, each unit having means for feeding a wire vertically, a circumferential wire feed means mounted for circular movement around the vertically fed wires, a plurality of welding units for welding the intersections of the vertically fed wires and the wire wrapped therearound as the intersections move upwardly, said welding units normally being in an out-of-the-way position, said welding units being constructed and arranged to grip the wire intersections of the cage being formed and rise with the same during the weld cycle, and means for selectively moving said welding units into operative position in timed relation to the movement of the circumferential wire feed means.

3. In apparatus for fabricating reinforcement wire cages, an upright center post, a plurality of beams supported at their inner ends by and radiating from said center post, each beam being adapted to support a wire feed mechanism, said post having means for supporting the inner ends of the beams individually selectively at either one of two elevations, an upright beam supporting frame beneath the outer end of each beam, a stationary foundation for said supports, and adjustable means carried by each beam supporting frame to change the elevation thereof and enable the same to support the outer end of its associated beam selectively at either one of two elevations.

4. In apparatus for fabricating reinforcement wire cages, an upright center post, a plurality of beams supported at their inner ends by and radiating from said center post, each beam being adapted to support a wire feed mechanism, said post having means for supporting the inner ends of the beams individually selectively at either one of two elevations, an upright beam supporting frame beneath the outer end of each beam, an elevated circular base, and means carried by each supporting frame adjustable to permit the frame to be supported selectively on said base or upon the ground adjacent thereto at a lower elevation.

5. In apparatus for fabricating reinforcement wire cages, an upright center post, a plurality of beams radiating from said center post, said post having means for supporting the inner ends of the beams individually selectively at either one of two elevations, means for supporting the individual beams at their outer ends at either of two selected elevations, a wire feed unit mounted on each beam and adjustably positionable therealong, said units being adapted to feed wires vertically, means rotatable around the vertically fed wires for winding a circumferential wire therearound, and welding means carried by each unit for welding the intersections of said vertically fed wires with said circumferential wire, a unit and its welding means being in an out-of-service position when its beam is in lowered position.

6. In a machine for making reinforcement wire cages, a plurality of wire feed units disposed circumferentially about a common center each adapted to feed a wire vertically, a slave selsyn motor for driving each unit, a rotary assembly adapted to rotate around said units, means carried by said assembly for feeding a circumferential wire to wind the same about said vertically fed wires, a main drive motor operatively connected to drive said assembly, a master selsyn motor driven by said main drive motor, and electric circuit means connecting said master and said slave selsyn motors.

7. The machine set forth in claim 6 in which clutch means is provided for disengaging said master selsyn motor.

8. In a machine for making reinforcement wire cages, means for feeding a wire vertically, comprising a support, a main frame carried by said support, a motor frame mounted on said main frame, said frames being relatively movable, a motor on said motor frame, a feed roller mounted on said motor frame and driven by said motor, an idler backup roller carried by said main frame for rotation about an axis parallel to the axis of rotation of said drive roller, said rollers being disposed to engage opposite sides of a wire to be fed, and spring means yieldably urging said frames relatively toward each other to cause said rollers to grip the wire being fed.

9. The machine set forth in claim 8 in which said motor frame is provided with a pair of laterally spaced feed rollers driven by said motor, in which said main frame is provided with a pair of backup rollers, and in which said backup rollers are so mounted as to equalize between them the loads applied thereto.

10. In a machine for making reinforcement wire cages, means for feeding a pair of wires in a given direction and equalizing the gripping force of the feed means thereon, comprising a support, a main frame carried by said support, a motor frame mounted on said main frame, said frames being relatively movable, a motor on said motor frame, a pair of laterally spaced feed rollers mounted on said motor frame and driven by said motor, a pair of levers mounted on said main frame, a backup roller carried by each lever in the plane of a feed roller, each wire to be fed being adapted to pass between a feed roller and a backup roller, spring means yieldably urging said frames relatively toward each other to cause said feed and guide rollers to grip the wire being fed, and an equalizer bar pivotally mounted on said main frame medially of said levers, said bar engaging said levers whereby the loads applied to said backup rollers are equalized between the same.

11. In a machine for making wire reinforcement cages, a beam extending transversely of the cross-sectional outline of the cage to be formed, a first frame mounted on said beam and movable therealong, means for anchoring said frame at an adjusted position on the beam, a second frame mounted for limited movement on said first frame, a motor-driven feed roller carried by one of said frames, a backup roller opposed to said feed roller and carried by the other of said frames, and spring means connected between the frames in a manner to urge the same in a direction to cause said rollers to move relatively toward each other and firmly engage a wire therebetween.

12. A machine as set forth in claim 11 in which said first frame receives said beam, in which said second frame receives said first frame, and in which said motorized feed roller is carried by said second frame.

13. In a machine for making wire reinforcement cages, a combined wire feed and welding assembly, comprising a main frame, an auxiliary frame, a motorized feed roller carried by one of said frames, a backup roller opposed to said feed roller carried by the other of said frames, spring means urging said frames in a direction to cause said rollers to tightly engage a wire between the same, and a welding assembly movably mounted on said main frame and including welding gun means adapted to grip the wire fed by said rollers and another wire overlying the same and rise therewith.

14. The machine set forth in claim 13 in which said welding assembly is normally in a lower, out of service position, and in which means is provided on said main frame for raising said welding assembly into an initial weld position.

15. In a machine for making wire reinforcement cages and including means for feeding wires vertically and means for wrapping a circumferential wire around the vertically fed wires, means for welding the intersections of said wrapped-around wire with one of said vertically fed wires, comprising a support, a frame, welding gun means carried by said frame, means mounting said frame for compound pivotal movement about horizontal axes spaced laterally of said one of said vertically fed wires, said frame normally lying with its welding gun means below the level at which said circumferential wire is wrapped around said vertically fed wires, and means mounted between the support and said frame for raising said frame to position the welding gun means in welding position.

16. In a machine for making wire reinforcement cages, a support, a frame mounted on said support, a pair of vertically spaced wire guide wheels on said frame, a motor-driven wire feed roller and backup roller at a height intermediate the guide rollers, an anvil carried by said frame above said feed and backup rollers adjacent which the wire to be fed passes and around which a circumferential wire is wrapped, a welding gun assembly movably mounted on said frame and normally below said anvil for welding intersections of said circumferential wire with the vertically fed wire, and means connected between said frame and said welding assembly for raising the latter into position to weld such intersections.

17. In a machine for making reinforcement wire cages including means for feeding a plurality of wires vertically, means for winding a circumferential wire around the vertically fed wires as the same rise, comprising a support positioned laterally outward of said vertically fed wires, means for producing relative rotary movement between said support and the group of vertically fed wires, a spool adapted to hold a coiled supply of circumferential wire rotatably mounted on said support, brake means associated with said spool, a wire tension sensing means operably located between the spool and the vertically fed wires, and means connecting said sensing means with said brake means.

18. In a machine for making reinforcement wire cages including means for feeding a plurality of wires vertically, means for winding a circumferential wire around the vertically fed wires as the same rise, comprising a support positioned laterally outward of said vertically fed wires, means for producing relative rotary movement between said support and the group of vertically fed wires, a spool adapted to hold a coiled supply of circumferential wire rotatably mounted on said support, a reserve sheave mounted on the support, a hub mounted for rotation about the axis of said spool, a stripping member on said hub extending axially of the spool outwardly of the periphery thereof, wire from said spool being adapted to pass around the stripping member and then around said reserve sheave before leaving the assembly, and means for locking said hub against rotation, said last-mentioned means being releasable upon transfer of undue torque to said hub, whereby to release said hub and its stripping member for rotation with said spool and sheave.

19. The machine set forth in claim 18 in which the means for locking the hub against rotation is effective, upon release, to actuate means for stopping the means for producing relative movement between the support and the group of vertically fed wires.

20. In a machine for making reinforcement wire cages including means for feeding a plurality of wires vertically, means for winding a circumferential wire around the vertically fed wires as the same rise, comprising a support laterally outward of said vertically fed wires, means for producing relative rotary movement between said support and the group of vertically fed wires, a spool adapted to hold a coiled supply of circumferential wire rotatably mounted on said support, brake means associated with said spool, a wire tension sensing means operably located between the spool and the vertically fed wires, means connecting said sensing means with said brake means, a reserve sheave mounted on the support, a hub mounted for rotation about the axis of said spool, a stripping member on said hub extending axially of the spool outwardly of the periphery thereof, wire from said spool being adapted to pass around the stripping member and then around said reserve sheave before leaving the assembly, and means for locking said hub against rotation, said last-mentioned means being releasable upon transfer of undue torque to said hub, whereby to release said hub and its stripping member for rotation with said spool and sheave.

References Cited by the Examiner
UNITED STATES PATENTS

| | | | |
|---|---|---|---|
| 1,765,330 | 6/1930 | Goldrick | 339—8 |
| 1,928,534 | 9/1933 | Halkyard et al. | 140—112 |
| 2,050,832 | 8/1936 | Edwards | 140—112 |
| 2,368,047 | 1/1945 | Southwick | 140—112 |
| 2,475,051 | 7/1949 | Raymond | 339—8 |
| 2,903,553 | 9/1959 | Butler | 219—56 |
| 3,063,476 | 11/1962 | Roesler | 140—112 |
| 3,125,132 | 3/1964 | Knisely | 140—71 |

CHARLES W. LANHAM, *Primary Examiner.*